(12) United States Patent
Ozaki et al.

(10) Patent No.: US 7,780,358 B2
(45) Date of Patent: Aug. 24, 2010

(54) SENSOR-INCORPORATED WHEEL SUPPORT BEARING ASSEMBLY

(75) Inventors: Takayoshi Ozaki, Iwata (JP); Tomomi Ishikawa, Iwata (JP); Kentarou Nishikawa, Iwata (JP)

(73) Assignee: NTN Corporation, Osaka (JP)

( * ) Notice: Subject to any disclaimer, the term of this patent is extended or adjusted under 35 U.S.C. 154(b) by 517 days.

(21) Appl. No.: 11/885,935

(22) PCT Filed: Mar. 1, 2006

(86) PCT No.: PCT/JP2006/303859

§ 371 (c)(1),
(2), (4) Date: Sep. 7, 2007

(87) PCT Pub. No.: WO2006/100880

PCT Pub. Date: Sep. 28, 2006

(65) Prior Publication Data

US 2009/0010582 A1 Jan. 8, 2009

(30) Foreign Application Priority Data

Mar. 18, 2005 (JP) .............................. 2005-079137

(51) Int. Cl.
*F16C 32/00* (2006.01)
(52) U.S. Cl. .................................................... 384/448
(58) Field of Classification Search ................. 384/448; 73/862.541, 862.322
See application file for complete search history.

(56) References Cited

U.S. PATENT DOCUMENTS

| 2006/0070462 | A1* | 4/2006 | Takizawa et al. ....... 73/862.541 |
| 2007/0014498 | A1* | 1/2007 | Aoki et al. ................... 384/448 |
| 2008/0037920 | A1* | 2/2008 | Lou ........................... 384/448 |
| 2008/0273823 | A1* | 11/2008 | Taniguchi et al. ........... 384/448 |
| 2008/0285901 | A1* | 11/2008 | Koike et al. ................. 384/448 |

FOREIGN PATENT DOCUMENTS

| JP | 2003-530565 | 10/2003 |
| JP | 2004-45219 | 2/2004 |
| JP | 2004-198210 | 7/2004 |
| JP | 2004-270898 | 9/2004 |
| WO | WO 01/77634 | 10/2001 |

OTHER PUBLICATIONS

International Search Report (Form PCT/ISA/210) of International Application No. PCT/JP2006/303859 (mailed on May 23, 2006).

* cited by examiner

*Primary Examiner*—Thomas R Hannon (57) ABSTRACT

A sensor-incorporated wheel support bearing assembly (18) includes an outer member (1) having an inner peripheral surface formed with double rows of raceway surfaces (4), an inner member (2) having an outer peripheral surface formed with raceway surfaces (5) opposed to the raceway surfaces (4) in the outer member (1), and double rows of rolling elements (3) interposed between the raceway surfaces (4) and (5) in the outer and inner members (1) and (2). Rings (9A) and (9B) each having an outer peripheral surface tapered is secured to the inner member (2). A displacement sensor (10) confronting the tapered outer peripheral surfaces of the rings (9A) and (9B) is mounted on the outer member (11) or a member (17) rigidly secured to the outer member (1) for measuring the distance between such displacement sensor (10) and the rings (9A) and (9B).

7 Claims, 11 Drawing Sheets

SENSOR-INCORPORATED WHEEL SUPPORT BEARING ASSEMBLY

FIELD OF THE INVENTION

The present invention relates to a wheel support bearing assembly equipped with a sensor, for example, a load sensor for detecting a load imposed on a bearing portion of the wheel.

BACKGROUND ART

For safety travel of an automotive vehicle, the wheel support bearing assembly equipped with a sensor for detecting the rotational speed of one of automotive wheels has hitherto been well known in the art. While the automobile traveling safety precaution is hitherto generally taken by detecting the rotational speed of the wheel, but it is not sufficient with the detection of only the rotational speed of the wheel and, therefore, it is required to achieve an improved safety control with the use of other sensor signals.

In view of this, it may be contemplated to achieve an attitude control based on the detection of a load acting on each of wheels during travel of an automotive vehicle. By way of example, a large load acts on the outside wheels during the cornering, on the wheels on one side during the run along left and right inclined road surfaces or on the front wheels during the braking, and, thus, a varying load acts on the vehicle wheels. Also, even in the case of the uneven live load, the loads acting on those wheels tend to become uneven. For this reason, if the loads acting on the wheels can be detected as needed, suspension systems for the vehicle wheels can be controlled beforehand based on results of detection of the loads so that the attitude of the automotive vehicle during the traveling thereof (for example, prevention of a rolling motion during the cornering, prevention of downward settling of the front wheels during the braking, and prevention of downward settling of the vehicle wheels brought about by an uneven distribution of live loads) can be controlled. However, no space for installation of the load sensor for detecting the load acting on the respective vehicle wheel is available and, therefore, the attitude control through the detection of the load can hardly be realized.

Also, in the event that in the near future the steer-by-wire is introduced to provide the system in which the wheel axle and the steering come not to be coupled mechanically with each other, and such system is increasingly used, information on the road surface comes to be required to transmit to the steering wheel held by a driver by detecting a load acting in a wheel axis direction.

In order to meet those needs hitherto recognized, it has been suggested to use various sensors such as temperature sensor, vibration sensor and load sensor in the wheel support bearing assembly so that in addition to the rotational speed, various parameters useful for the travel of the automotive vehicle can be detected. (See, for example, the Japanese Laid-open Patent Publications No. 2004-45219 and No. 2004-198210.)

The first mentioned patent document No. 2004-45219 discloses the determination of the type of load, the direction of the load and the magnitude of the load by the utilization of signals provided for by eight displacement sensors for detection of a horizontal load Fx, an axial load Fy acting in a direction parallel to the axis of rotation, a vertical load Fz, a moment load Mx acting around a horizontal axis, a moment load My acting around a rotation axis and a moment load Mz acting around a vertical axis, all acting on the wheel support bearing assembly. Also, the second mentioned patent document No. 2004-198210 discloses, in combination with displacement sensors, the additional use of a separate sensor oriented in a radial direction or a thrust direction relative to the displacement sensors for the purpose of eliminating the effects of heat expansion and/or heat shrinkage of bearing elements due to the change in temperature.

However, the bearing assembly disclosed in any one of the above discussed patent documents requires the use of at least 12 sensors in order to determine those loads acting on the wheel support bearing assembly with high accuracy while the influences on the bearing elements brought about by the change in temperature are removed. Thus, the number of component parts (sensors) to be added for the measurement of those loads is increased and, therefore, it is unavoidable to increase the cost and the weight of the bearing assembly. Also, the use of the increased number of the sensors eventually results in increase of the size of a detecting circuit and/or a controller for those sensors, unnecessarily accompanied by increase of the cost and the weight. For those reasons, the bearing assembly disclosed in any one of the above discussed patent documents is ineffective to accomplish reduction in cost and weight, both of which have been desired for in the wheel support bearing assembly.

DISCLOSURE OF THE INVENTION

In view of the foregoing, an object of the present invention is to provide a wheel support bearing assembly of a type in which loads acting on the wheel support bearing assembly can be highly accurately and stably detected with a minimized number of sensors and in which the load sensor unit can be mounted compactly in an automotive vehicle.

The sensor-incorporated wheel support bearing assembly according to the present invention is a bearing assembly for rotatably supporting a wheel relative to an automotive vehicle, which includes an outer member having an inner peripheral surface formed with double rows of raceway surfaces, an inner member having an outer peripheral surface formed with raceway surfaces opposed to the raceway surfaces in the outer member, and double rows of rolling elements interposed between the raceway surfaces in the outer and inner members. In this wheel support bearing assembly, a ring having an outer peripheral surface tapered is secured to the inner member and a displacement sensor operable to measure the distance between it and the ring is mounted on the outer member or a member, that is rigidly secured to the outer member, to confront the tapered outer peripheral surface of the ring.

According to this construction, since the tapered ring is secured to the inner member and the displacement sensor confronting the tapered ring is mounted on the outer member, the distance between the displacement sensor and the ring, which changes when the distance between the inner and outer members changes as a result of the load acting on the wheel support bearing assembly, can be detected by the displacement sensor. Change of the distance detected by the displacement sensor includes a displacement component acting on a radial direction and a displacement component acting in a thrust direction since the displacement sensor is so arranged as to confront the tapered outer peripheral surface of the ring. Because of this, it is easy to remove influences which may be bought about by temperature-dependent thermal expansion and shrinkage of the bearing element and there is no need to use a temperature sensor. Accordingly, the load acting on the wheel support bearing assembly can be accurately detected with a minimized number of sensors. As described above, since the displacement sensor is mounted in the wheel support bearing assembly with the number of sensors minimized, the load sensor unit including the displacement sensor can be mounted compactly in the automotive vehicle and the load acting on the wheel can be detected stably.

In the present invention, the ring may include first and second rings mounted on the outer peripheral surface of the inner member in axially juxtaposed relation to each other and having respective outer peripheral surfaces that are tapered in respective directions opposite to each other, and the displacement sensor is disposed in face-to-face relation with the first and second rings. Also, the displacement sensor may include eight sensor elements. Two sensor elements are disposed on each of upper and lower portions of the outer member with respect to a horizontally lying longitudinal axis of the bearing assembly so as to confront the first and second rings whereas two sensor elements are disposed on each of right and left portions of the outer member with respect to the longitudinal axis of the bearing assembly along a horizontal axis perpendicular to the longitudinal axis of the bearing assembly so as to confront the first and second rings. In the present invention, the bearing assembly may be provided with a calculator for calculating an output of the displacement sensor to determine the load acting on the inner member.

When such loads as a horizontal load Fx, an axial load Fy acting in a direction parallel to the axis of rotation or the longitudinal axis of the bearing assembly, a vertical load Fz, a moment load Mx acting around the horizontal axis, a moment load My acting around the rotation axis and a moment load Mz acting around a vertical axis of the bearing assembly are imposed on the wheel, the distance between the outer and inner members of the bearing assembly changes. For this reason, the distance between the ring and the displacement sensor changes correspondingly, with the amount of such displacement being subsequently outputted from the displacement sensor. When the output signal from the displacement sensor is calculated, the load acting on the wheel support bearing assembly can be determined.

In such case, since signals obtained from four to eight sensor elements of the displacement sensor are used to determine the load, it is possible to achieve a load detection with high accuracy. Even in this case, since the displacement sensor is arranged so as to confront the tapered ring in radial and thrust directions, it is quite easy to remove influences which may be brought about by thermal expansion and shrinkage of the bearing elements resulting from temperature change.

In the present invention, the displacement sensor may be of a reluctance type including a coil winding. Also, the ring may be made of a ferromagnetic material and the displacement sensor may include a combination of a magnet and a magnetic detecting element capable of providing an analog output. For the magnetic detecting element capable of providing the analog output, a Hall element, for example, can be employed.

The displacement sensor of the reluctance type is excellent in detection accuracy. In the case of the displacement sensor of the reluctance type, the cost of an electric circuit disposed downstream of the displacement sensor for the purpose of signal processing is high. On the other hand, the cost can be reduced if the magnetic detecting element is employed in the form of, for example, a Hall element.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

BEST MODE FOR CARRYING OUT THE INVENTION

A first preferred embodiment of the present invention will be described with particular reference to FIGS. 1 to 17. This first embodiment is directed to a wheel support bearing assembly for rotatably supporting a drive wheel of an automotive vehicle, which assembly is an inner rotating type of a third generation model. It is to be noted that in the specification herein set forth, the terms "outboard" and "inboard"

represent one side of the vehicle body away from the longitudinal center of the vehicle body and the other side of the vehicle body close to the longitudinal center of the vehicle body, respectively. For example, in FIGS. 1 and 3, a left portion represents the outboard side while a right portion represents the inboard side.

Figure 1:
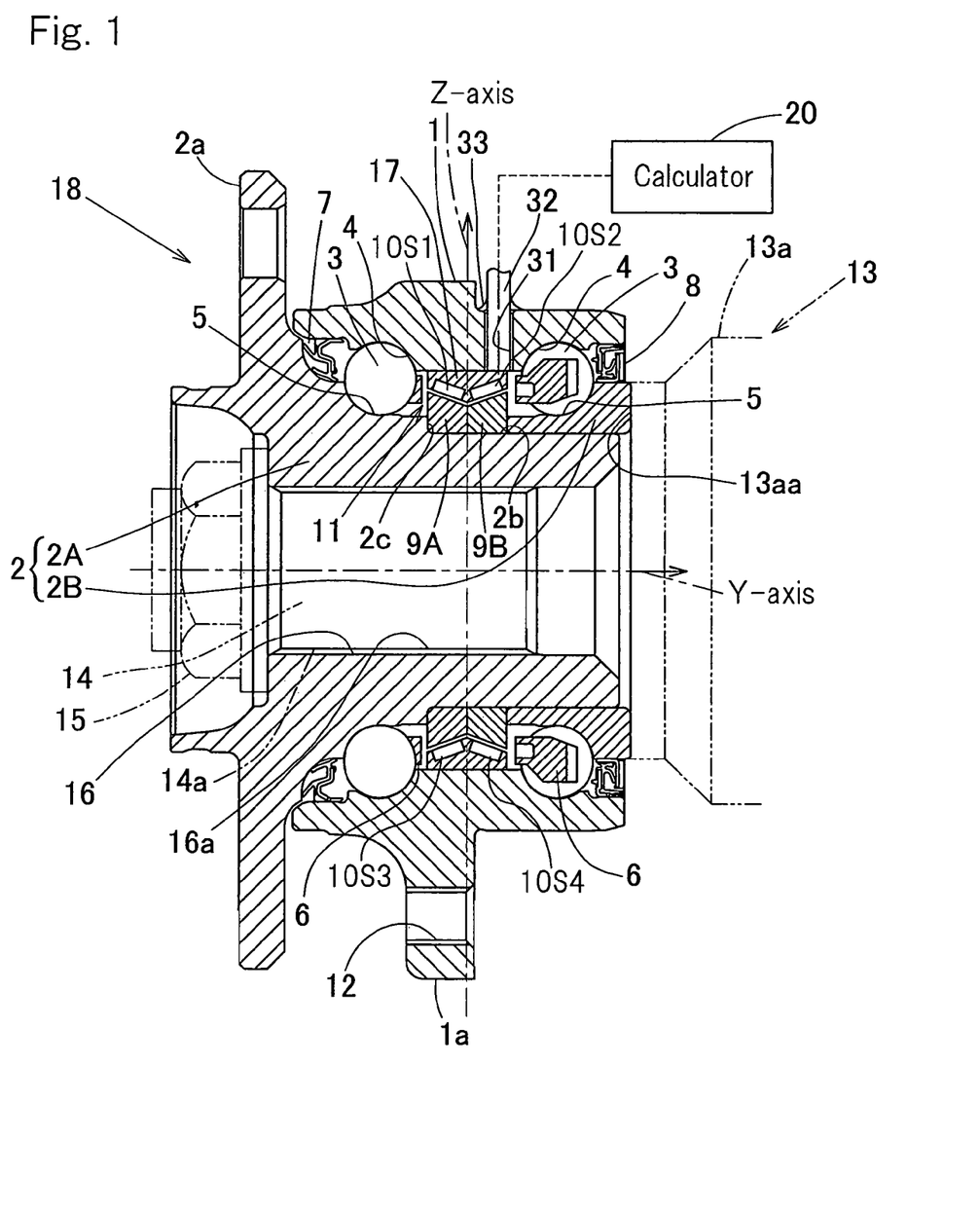
FIG. 1 is a longitudinal sectional view of a sensor-incorporated wheel support bearing assembly according to a first preferred embodiment of the present invention.

The wheel support bearing assembly 18 includes an outer member 1 having an inner peripheral surface formed with a plurality of, for example, two, rows of raceway surfaces 4, an inner member 2 having an outer peripheral surface formed with raceway surfaces 5 opposed to those raceway surfaces 4, and rows of rolling elements 3 interposed between the raceway surfaces 4 and the raceway surfaces 5. This wheel support bearing assembly 18 is in the form of a double row angular contact ball bearing, in which each of the raceway surfaces 4 and 5 represents an arcuate shape in section and the raceway surfaces 4 and 5 are so formed as to have respective contact angles held in back-to-back relation with each other. The rolling elements 3 are in the form of a ball and are retained by a retainer 6 employed for each row of those rolling elements 3. Outboard and inboard open ends of an annular bearing space delimited between the inner and outer members 2 and 1 are sealed by respective contact type sealing members 7 and 8, each forming a sealing device.

The outer member 1 is a member that serves as a stationary member and is of one-piece construction including a vehicle body fitting flange 1a formed in an outer periphery thereof for connection with a knuckle (not shown). The vehicle body fitting flange 1a is fixedly fastened to the knuckle, mounted on an automotive body structure (not shown), through a plurality of bolts positioned at a corresponding number of circumferential locations. The vehicle body fitting flange 1a is formed with threaded holes 12 for insertion of the bolts. Each of the bolts is passed through a corresponding throughhole defined in the knuckle, and is further inserted in the corresponding bolt insertion hole 12 with an externally threaded free end of the bolt firmly engaged in such bolt insertion hole 12. Instead of the use of the threaded bolt insertion hole 12, the bolt insertion hole 12 may be a mere hole so that a nut (not shown) can be threadingly mounted on the externally threaded free end of the respective bolt.

The inner member 2 is a member that serves as a rotatable member and is made up of a hub axle 2A having an outer periphery formed with a wheel mounting flange 2a, and a separate inner race 2B mounted fixedly on an inboard end of the hub axle 2A. An outer ring 13a of a constant velocity universal joint 13, which serves as one of coupling members, is firmly connected to the hub axle 2A. The raceway surfaces 5 are defined in the hub axle 2A and the inner race 2B, respectively. The hub axle 2A has a center bore 16 defined therein, and a stem 14 formed integrally with the outer race 13a of the constant velocity universal joint 13 is inserted into the center bore 16. The outer ring 13a of the constant velocity universal joint 13 is firmly coupled with the inner member 2 with a nut 15 fastened to a free end of the stem 14 that has been passed through the center bore 16. At this time, a stepped face 13aa so defined in the outer ring 13a of the constant velocity universal joint 13 as to be oriented outboard is urged against an inboard-facing end face of the inner race 2B, then press-fitted onto the hub axle 2A to firmly sandwich the inner member 2 axially between the constant velocity universal joint outer ring 13a and the nut 15. The center bore 16 in the hub axle 2A has a peripheral surface formed with a plurality of spline grooves 16a that are engaged through spline connection with corresponding spline projections 14a defined in an outer peripheral surface of the stem 14.

A load sensor unit 11 is positioned within the bearing space of the wheel support bearing assembly 18 at a location generally intermediate between the double rows of the raceway surfaces 4 and 5. This load sensor unit 11 includes two rings 9A and 9B each having an outer peripheral surface tapered and press-fitted onto the inner member 2, and a displacement sensor 10 having a plurality of sensor elements 10S1, 10S2, . . . which are disposed in the outer member 1 so as to confront the respective tapered outer peripheral surfaces of those rings 9A and 9B. The outer peripheral surface of the hub axle 2A is partly reduced in diameter on the inboard side of the outboard raceway surface 5 to form a reduced diameter outer peripheral surface 2b. The rings 9A and 9B are axially press-fitted side-by-side onto the reduced diameter outer peripheral surface 2b. Those rings 9A and 9B are axially fixedly positioned while sandwiched between a stepped face 2c, formed between the reduced diameter outer peripheral surface 2b and the outboard raceway surface 5, and an end face of the inner ring 2B facing the outboard side. In the first embodiment, the outer peripheral surface of the ring 9A positioned on the outboard side is tapered with its diameter increasing in a direction towards the outboard side, whereas the outer peripheral surface of the ring 9B positioned on the inboard side is tapered with its diameter increasing in a direction towards the inboard side. In other words, those rings 9A and 9B are positioned relative to each other with their outer peripheral surfaces inclined in respective directions opposite to each other as if those rings 9A and 9B were to form a single ring having an outer peripheral surface formed with a generally V-sectioned groove. It is, however, to be noted that in place of the use of the separate rings 9A and 9B, the rings 9A and 9B may be integrated to form a single ring with its outer peripheral surface defining a generally V-sectioned groove and the single ring is press-fitted onto the hub axle 2A.

Figure 2:
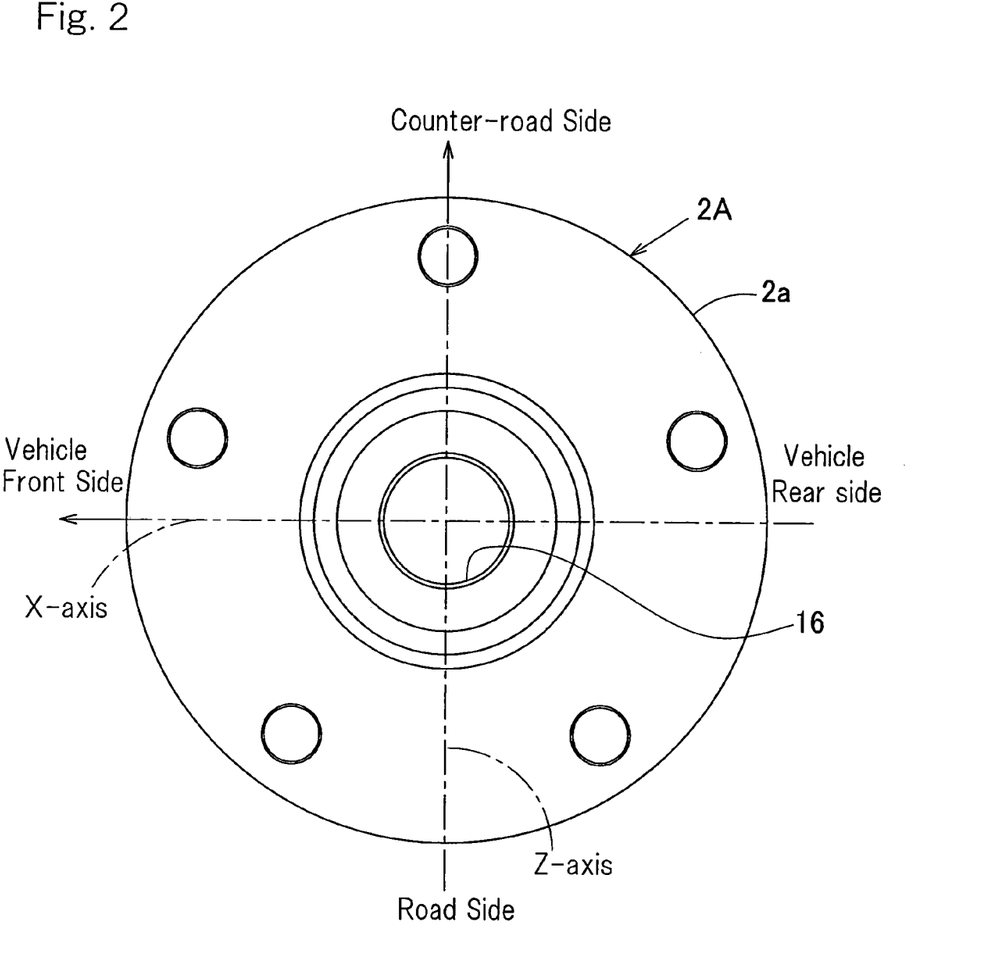
FIG. 2 is a side view of the wheel support bearing assembly as viewed from an outboard side.

The displacement sensor 10 includes a plurality of, for example, eight sensor elements each operable to measure the distance between it and the corresponding ring 9A or 9B. Of the eight sensor elements, two sensor elements are disposed on each of upper and lower portions of the outer member 1 with respect to a vertical axis (represented by a Z-axis direction) of the automotive body structure, when viewed axially from the side of the wheel mounting flange 2a as shown in FIG. 2, to face the outer peripheral surface of the corresponding ring 9A or 9B. For the remaining four sensor elements, two sensor elements are disposed on each of forward and rearward portions of the outer member 1 with respect to a horizontal axis (represented by an X-axis direction perpendicular to the Z-axis direction or the direction of the longitudinal axis of the bearing assembly) of the automotive body structure, to face the respective outer peripheral surface of the corresponding ring 9A and 9B.

Figure 3:
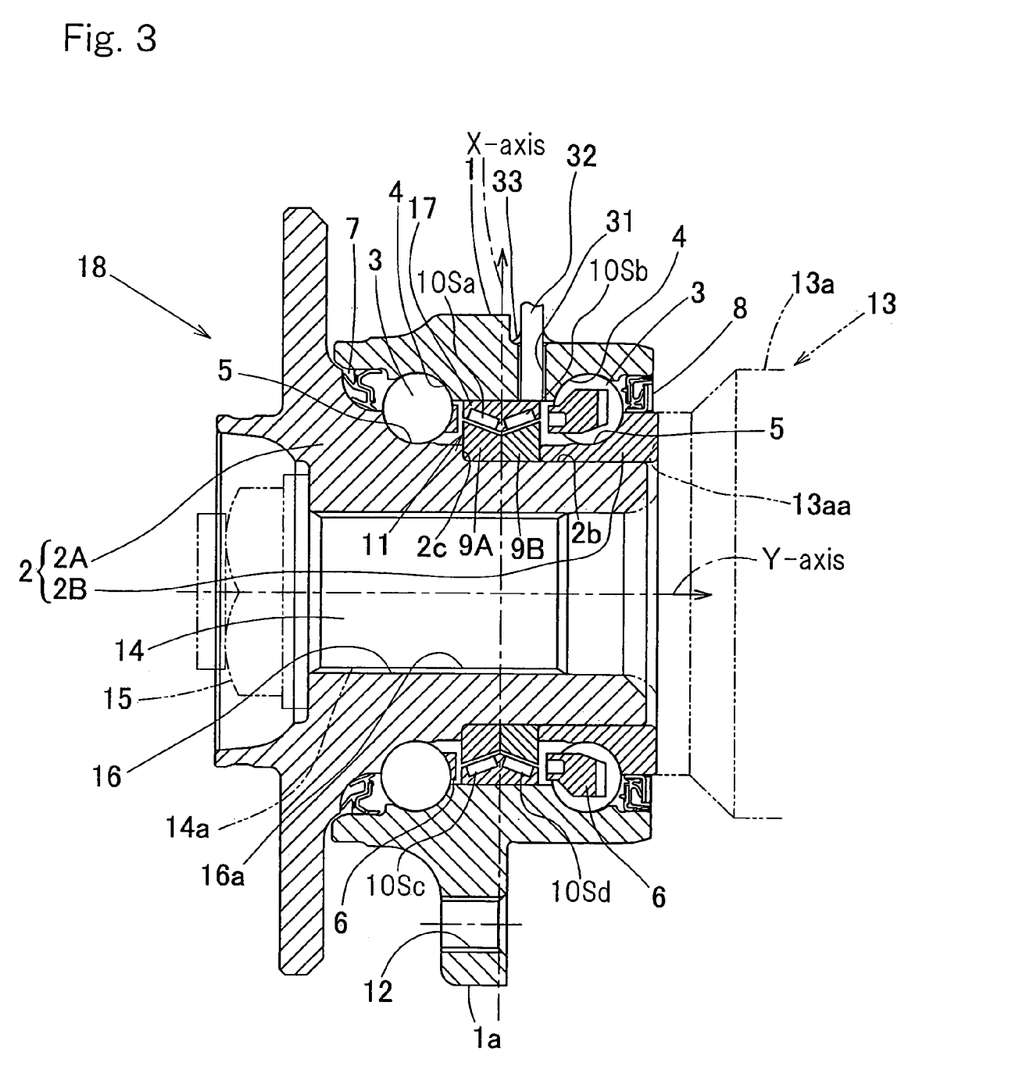
FIG. 3 is a horizontal sectional view of the wheel support bearing assembly.

More specifically, as shown in FIG. 1 in a longitudinal sectional representation of the wheel support bearing assembly 18 with its longitudinal axis lying horizontally, the sensor elements 10S1 and 10S3 are positioned along the Z-axis upwardly of and downwardly of the outer peripheral surface of the outboard ring 9A, respectively, whereas the sensor elements 10S2 and 10S4 are positioned along the Z-axis upwardly of and downwardly of the outer peripheral surface of the inboard ring 9B, respectively. Also, as shown in FIG. 3 in a horizontal sectional representation of the wheel support bearing assembly 18, the sensor elements 10Sa and 10Sc are positioned along the X-axis forwardly of and rearwardly of the outer peripheral surface of the outboard ring 9A, respectively, with respect to the direction of travel of the automotive vehicle whereas the sensor elements 10Sb and 10Sd are positioned along the X-axis forwardly of and rearwardly of the outer peripheral surface of the inboard ring 9B, respectively, with respect to the direction of travel of the automotive vehicle.

In the first embodiment, all of those eight sensor elements 10S are accommodated within a sensor support member 17 supporting the sensor elements 10S. The sensor support member 17 is press-fitted into the outer member 1 so as to be positioned intermediate between the raceway surfaces 4 and 4. It is to be noted that the sensor elements 10S may be arranged directly on the inner peripheral surface of the outer member 1 with no support member 17 employed.

Eight detection signals emerging from those sensor elements 10S are supplied to a controller (not shown) through a harness 32 passed through a throughhole 31 that is defined in the outer member 1 so as to extend completely across the wall thickness of the outer member 1 from the inner peripheral surface to the outer peripheral surface. The harness 32 is fixed to the outer member 1 by a sealing member 33 and, thanks to the use of the sealing member 33, no muddy water or the like enters the interior of the wheel support bearing assembly 18 through the throughhole 31.

Figure 4:
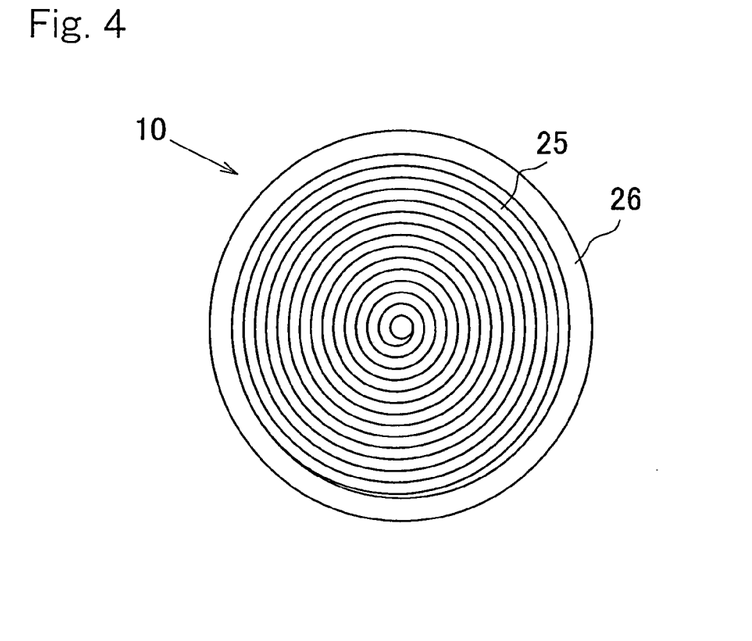
FIG. 4 is a plan view showing one example of a displacement sensor, which is a component part of a load sensor unit mounted on the wheel support bearing assembly.
Figure 5:
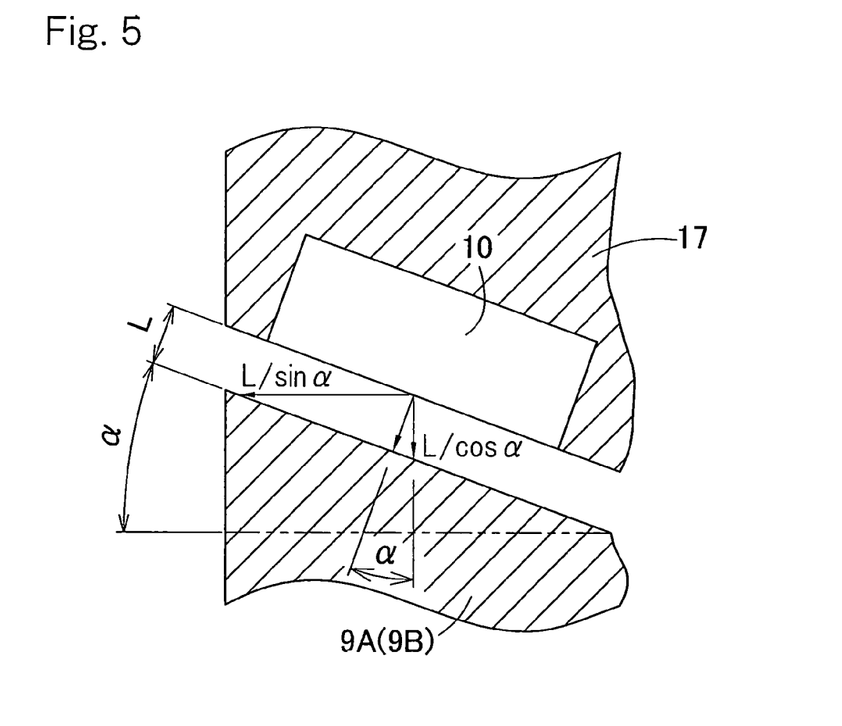
FIG. 5 is an explanatory diagram showing the relation in position between a ring and the displacement sensor in the load sensor unit.

For the displacement sensor 10, any suitable sensor element can be employed and the use of the sensor element of an eddy current type is shown in FIG. 4. This illustrated displacement sensor 10 is of a structure including a sensor housing 26 made of a resinous material and a coil winding 25 arranged in the shape of a spiral on the sensor housing 26. It is to be noted that the coil winding 25 of the spiral shape may be wound in either a single layer or multiple layers. The displacement sensor 10 in this case is a reluctance type capable of detecting displacement based on change in inductance of the coil winding 25, which results from change in distance (change of an air gap) between the displacement sensor 10 and the outer peripheral surfaces of the rings 9A and 9B, which are a sensor target.

The displacement sensor 10 may be a type including a combination of a magnet and a magnetic detecting element (for example, a Hall element) capable of providing an analog output. In such case, the rings 9A and 9B have to be made of a ferromagnetic material. Although in the case of the eddy current type discussed above, the cost of an electric circuit designed to be disposed downstream of the displacement sensor 10 for the signal processing will be high, the sensor type utilizing the magnetic detecting element such as a Hall element is effective to reduce the cost.

The operation of the load sensor unit 11 to detect a load acting on the hub axle 2A of the wheel support bearing assembly 10 will now be described.

During the travel of the automotive vehicle, six kinds of loads including a horizontal load Fx, an axial load Fy, a vertical load Fz, a moment load Mx acting around the horizontal axis (X-axis), a moment load My acting around the rotation axis (Y-axis) and a moment load Mz acting around the vertical axis (Z-axis) are imposed on the hub axle 2A through a tire and a wheel depending on the traveling condition of the automotive vehicle. When the loads are acting, the hub axle 2A undergoes a motion relative to the outer member 1. In other words, the distance between the rings 9A and 9B and the displacement sensor 10 changes. The load sensor unit 11 determines the direction and the magnitude of those loads acting on the hub axle 2A by calculating the amount of the change in distance that is measured by the displacement sensor 10.

Because the displacement sensor 10 is so positioned as to confront the tapered outer peripheral surfaces of the rings 9A and 9B, the amount of change of the distance between the displacement sensor 10 and the rings 9A and 9B contains a displacement component in the horizontal or vertical direction (X-axis or Z-axis direction) and a displacement component in the axial direction or the longitudinal direction of the hub axle 2A (Y-axis direction). Assuming that the distance between the displacement sensor 10 and the rings 9A and 9B is expressed by L and the angle of tapering of the outer peripheral surface of each of the rings 9A and 9B is expressed by α, the displacement in the horizontal or vertical direction (X-axis or Z-axis direction) can be expressed by L×cos α and the displacement in the axial direction (Y-axis direction) can be expressed by L×sin α (See FIG. 5).

Figure 6:
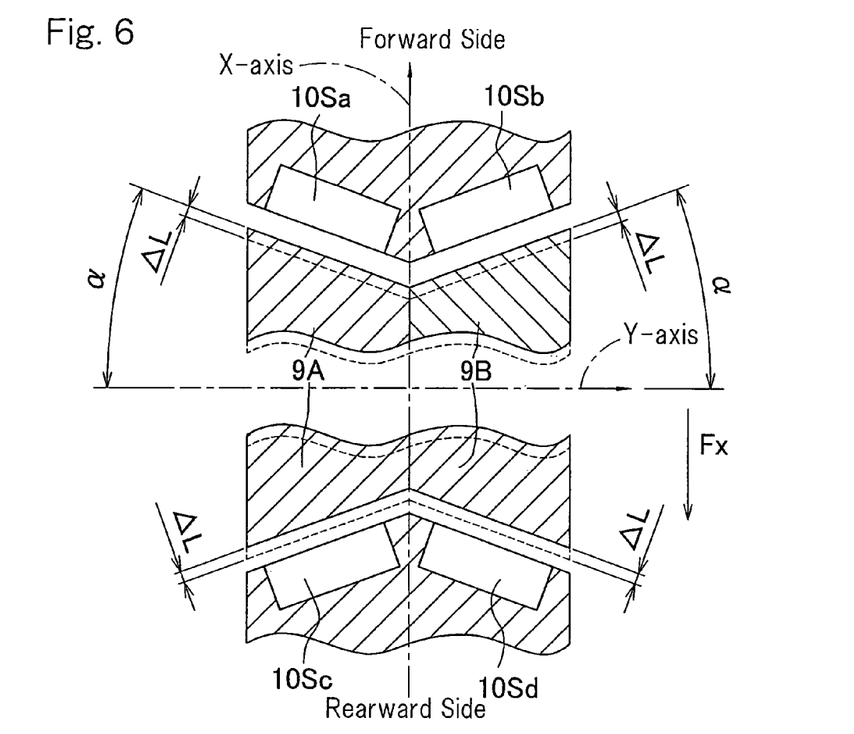
FIG. 6 is an explanatory diagram showing the manner of detection of load with the load sensor unit when a horizontal load acts on the wheel support bearing assembly.

FIG. 6 illustrates an explanatory diagram used to explain the manner of detection when the horizontally (X-axis direction) acting load (Fx) acts on the hub axle 2A in a direction rearwardly of the automotive vehicle (in a negative direction of the X-axis), that is, towards the rearside of the vehicle body. In FIG. 6, respective positions of the rings 9A and 9B assumed when the load acts on the hub axle 2A are expressed by the broken lines. At this time, the rings 9A and 9B move away from the sensor elements 10Sa and 10Sb disposed in the horizontal X-axis direction on the respective forward sides relative to the outer peripheral surfaces of the rings 9A and 9B with respect to the direction of travel of the automotive vehicle, resulting in increase of the distance between each of the sensor elements 10Sa and 10Sb and the corresponding ring 9A or 9B. On the other hand, the rings 9A and 9B move close to the sensor elements 10Sc and Sd disposed in the horizontal direction on the respective rearward sides relative to the outer peripheral surfaces of the rings 9A and 9B with respect to the direction of travel of the automotive vehicle, resulting in decrease of the distance between each of the sensor elements 10Sc and 10Sd and the corresponding ring 9A or 9B.

Figure 7:
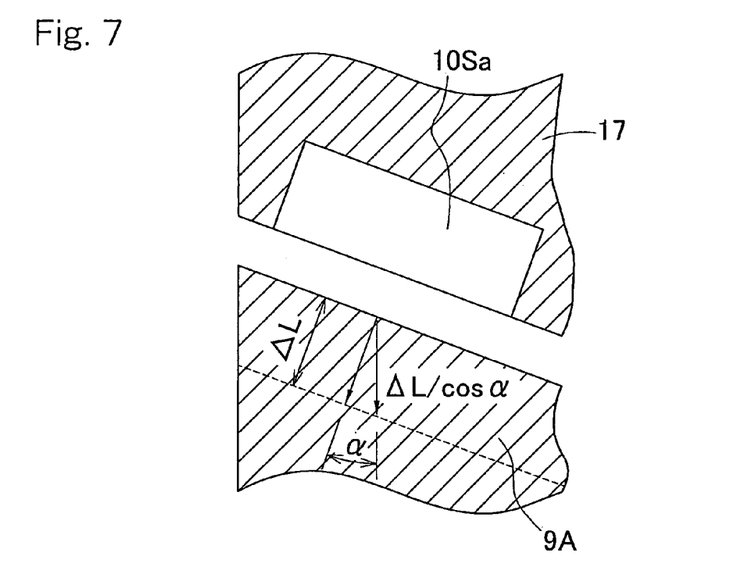
FIG. 7 is a fragmentary enlarged view of a portion of FIG. 6.

FIG. 7 illustrates the sensor element 10Sa and its vicinity on an enlarged scale. At this time, assuming that the distance between the displacement sensor 10 and the rings 9A and 9B confronting the sensor 10 is changed by ΔL by the horizontally acting load Fx, a positive sign is used in the case where such distance increases relative to that exhibited when under a non-loaded condition (shown by the solid line in FIGS. 6 and 7) and a negative sign is used in the case where such distance decreases relative to that exhibited when under the non-loaded condition, respective displacement components of the sensor elements 10Sa, 10Sb, 10Sc and 10Sd in the horizontal direction (X-axis direction) can be expressed as follows, noting that a represents the angle of tapering of each of the rings 9A and 9B.

Displacement detected by Sensor Element 10Sa in the horizontal direction (X-axis direction):

$$\Delta Sax = \Delta L / \cos \alpha$$

Displacement detected by Sensor Element 10Sb in the horizontal direction (X-axis direction):

$$\Delta Sbx = \Delta L / \cos \alpha$$

Displacement detected by Sensor Element 10Sc in the horizontal direction (X-axis direction):

$$\Delta Scx = -\Delta L / \cos \alpha$$

Displacement detected by Sensor Element 10Sd in the horizontal direction (X-axis direction):

$$\Delta Sdx = -\Delta L / \cos \alpha$$

Using those amounts of displacement, the distance of movement of the hub axle 2A relative to the outer member 1 can be calculated by the following equation, in which the displacement of the hub axle 2A in the X-axis direction is expressed by $\Delta X$:

$$\Delta X = \frac{1}{4} \times (\Delta Sax + \Delta Sbx - \Delta Scx - \Delta Sdx)$$

$$= \frac{1}{4} \times \{(\Delta L/\cos\alpha) + (\Delta L/\cos\alpha) - (-\Delta L/\cos\alpha) - (-\Delta L/\cos\alpha)\}$$

$$= \Delta L/\cos\alpha$$

With the respective outputs of the four sensor elements 10Sa, 10Sb, 10Sc and 10Sd, it is possible to detect only the displacement of the hub axle 2A relative to the outer member 1 in the X-axis direction, which has resulted from the horizontally acting load Fx. When the amount of displacement so detected is substituted into the equation which determines the load based on the amount of displacement predetermined from experiments and simulations, the horizontally acting load Fx is calculated. Such calculation is carried out by a calculator 20 (FIG. 1) connected to the harness 32. Also, since the detection of the amount of displacement is made by the four sensor elements 10Sa, 10Sb, 10Sc and 10Sd, the detection accuracy is good. Yet, since the sensor elements 10Sa, 10Sb, 10Sc and 10Sd are arranged symmetrically relative to the X-axis and the Y-axis, any change in displacement resulting from temperature-dependent thermal expansion and shrinkage of the rings 9A and 9B can be removed easily.

Figure 8:
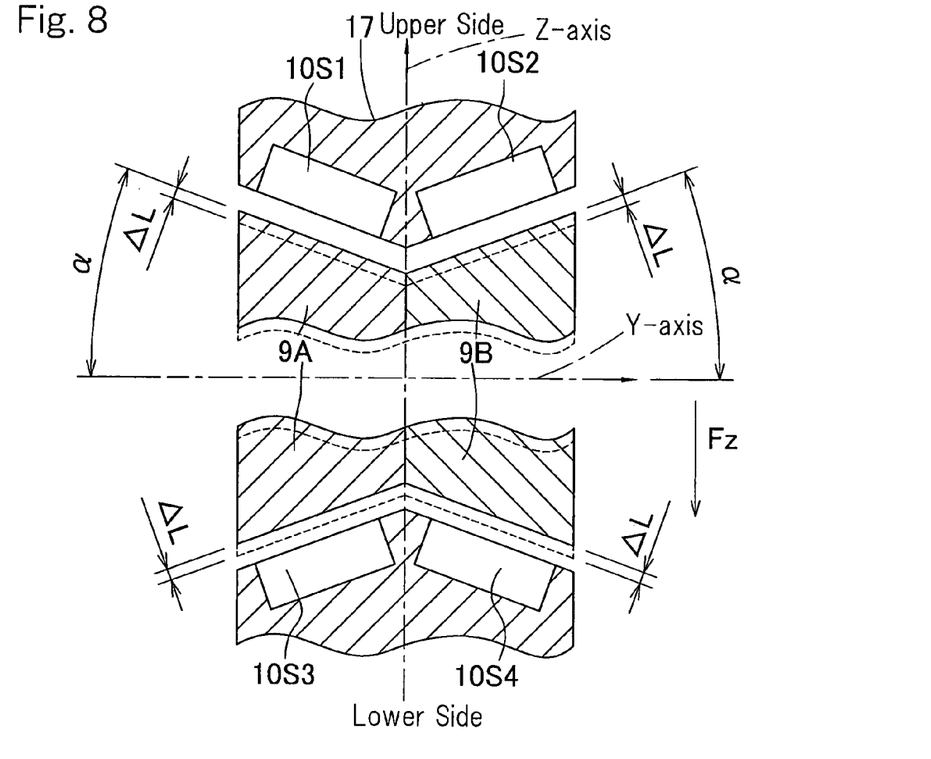
FIG. 8 is an explanatory diagram showing the manner of detection of load with the load sensor unit when a vertical load acts on the wheel support bearing assembly.

FIG. 8 illustrates an explanatory diagram used to explain the manner of detection when the vertically (Z-axis direction) acting load (Fz) acts on the hub axle 2A in a direction towards the road surface relative to the automotive vehicle (in a negative direction of the Z-axis). In this figure, respective positions of the rings 9A and 9B assumed when the vertical load Fz acts on the hub axle 2A are expressed by the broken lines. At this time, the rings 9A and 9B move away from the sensor elements 10S1 and 10S2 disposed upwardly of the respective outer peripheral surfaces of the rings 9A and 9B, resulting in increase of the distances between the sensor elements 10S1 and 10S2 and the rings 9A and 9B. On the other hand, the rings 9A and 9B move close to the sensor elements 10S3 and 10S4 disposed downwardly of the respective outer peripheral surfaces of the rings 9A and 9B, resulting in decrease of the distances between the sensor elements 10S3 and 10S4 and the rings 9A and 9B.

Figure 9:
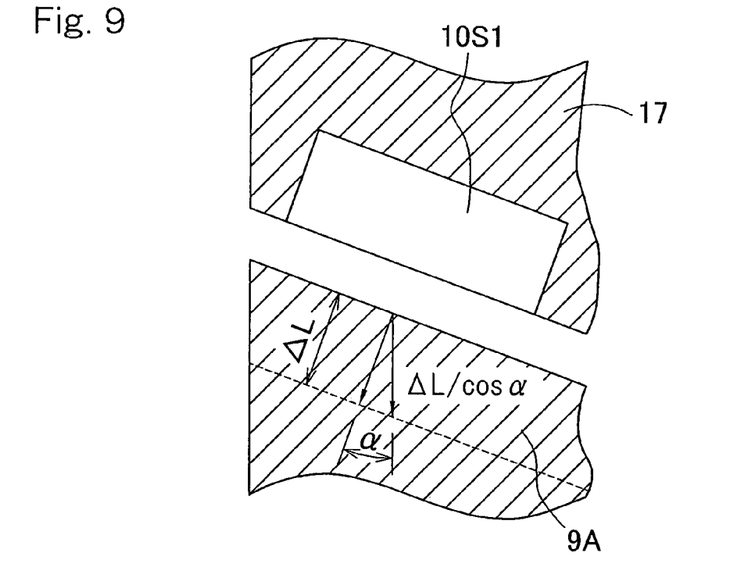
FIG. 9 is a fragmentary enlarged view of a portion of FIG. 8.

FIG. 9 illustrates, on an enlarged scale, the sensor element 10S1 and its vicinity under that condition. At this time, assuming that the distance between the displacement sensor 10 and the ring 9A or 9B confronting the displacement sensor 10 is changed by $\Delta L$ by the vertically acting load Fz, a positive sign is used in the case where such distance increases relative to that exhibited when under a non-loaded condition (shown by the solid line in FIGS. 8 and 9) and a negative sign is used in the case where such distance decreases relative to that exhibited when under the non-loaded condition, respective displacement components of the sensor elements 10S1, 10S2, 10S3 and 10S4 in the vertical direction (Z-axis direction) can be expressed as follows, noting that α represents the angle of tapering of each of the rings 9A and 9B.

Displacement detected by Sensor Element 10S1 in the vertical direction (Z-axis direction):

$$\Delta S1z = \Delta L/\cos\alpha$$

Displacement detected by Sensor Element 10S2 in the vertical direction (Z-axis direction):

$$\Delta S2z = \Delta L/\cos\alpha$$

Displacement detected by Sensor Element 10S3 in the vertical direction (Z-axis direction):

$$\Delta S3z = -\Delta L/\cos\alpha$$

Displacement detected by Sensor Element 10S4 in the vertical direction (Z-axis direction):

$$\Delta S4z = -\Delta L/\cos\alpha$$

Using those amounts of displacement, the distance of movement of the hub axle 2A relative to the outer member 1 can be calculated by the following equation, in which the displacement of the hub axle 2A in the Z-axis direction is expressed by $\Delta Z$:

$$\Delta Z = \frac{1}{4} \times (\Delta S1z + \Delta S2z - \Delta S3z - \Delta S4z)$$

$$= \frac{1}{4} \times \{(\Delta L/\cos\alpha) + (\Delta L/\cos\alpha) - (-\Delta L/\cos\alpha) - (-\Delta L/\cos\alpha)\}$$

$$= \Delta L/\cos\alpha$$

With the respective outputs of the four sensor elements 10S1, 10S2, 10S3 and 10S4, it is possible to detect only the displacement of the hub axle 2A relative to the outer member 1 in the Z-axis direction, which has resulted from the vertically acting load Fz. When the amount of displacement so detected is substituted into the equation which determines the load based on the amount of displacement predetermined from experiments and simulations, the vertical load Fz is calculated. Such calculation is carried out by the calculator 20 (FIG. 1) connected to the harness 32. Also, since detection is made by the four sensor elements 10S1, 10S2, 10S3 and 10S4, the detection accuracy is good. Yet, since the sensor elements 10S1, 10S2, 10S3 and 10S4 are arranged symmetrically relative to the Z-axis and the Y-axis, any change in displacement resulting from temperature-dependent thermal expansion and shrinkage of the rings 9A and 9B can be removed easily.

Figure 10:
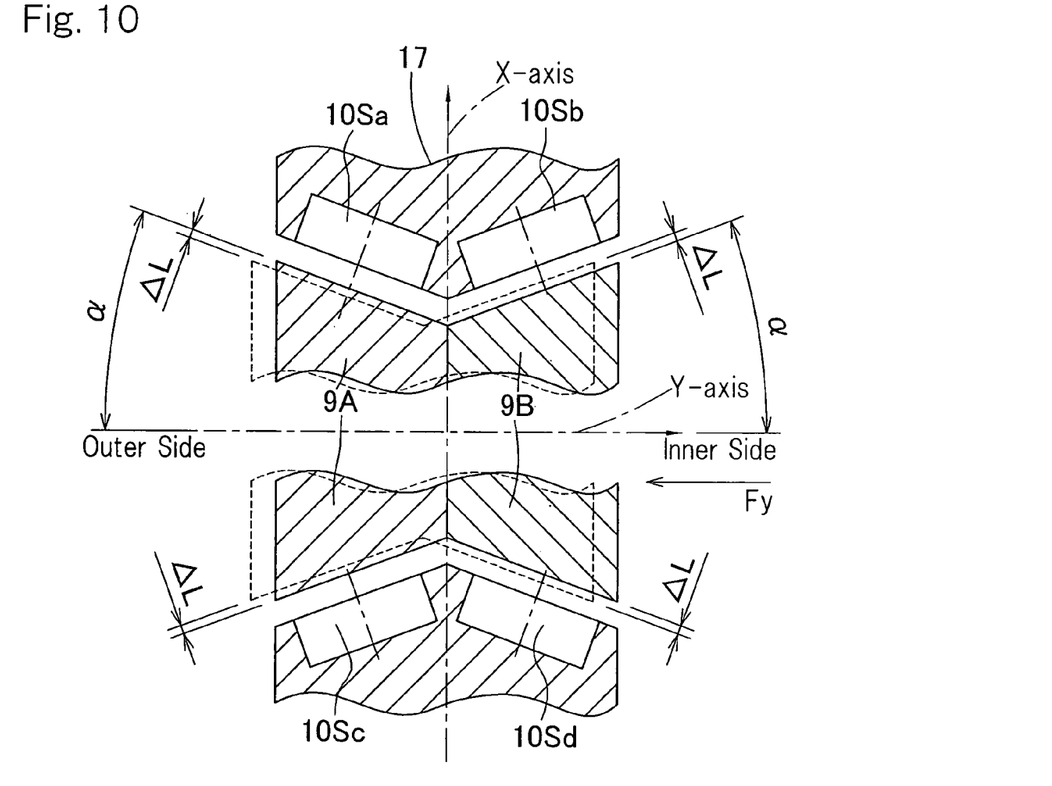
FIG. 10 is an explanatory diagram in a horizontal sectional representation, showing the manner of detection of load with the load sensor unit when an axial load acts on the wheel support bearing assembly.
Figure 12:
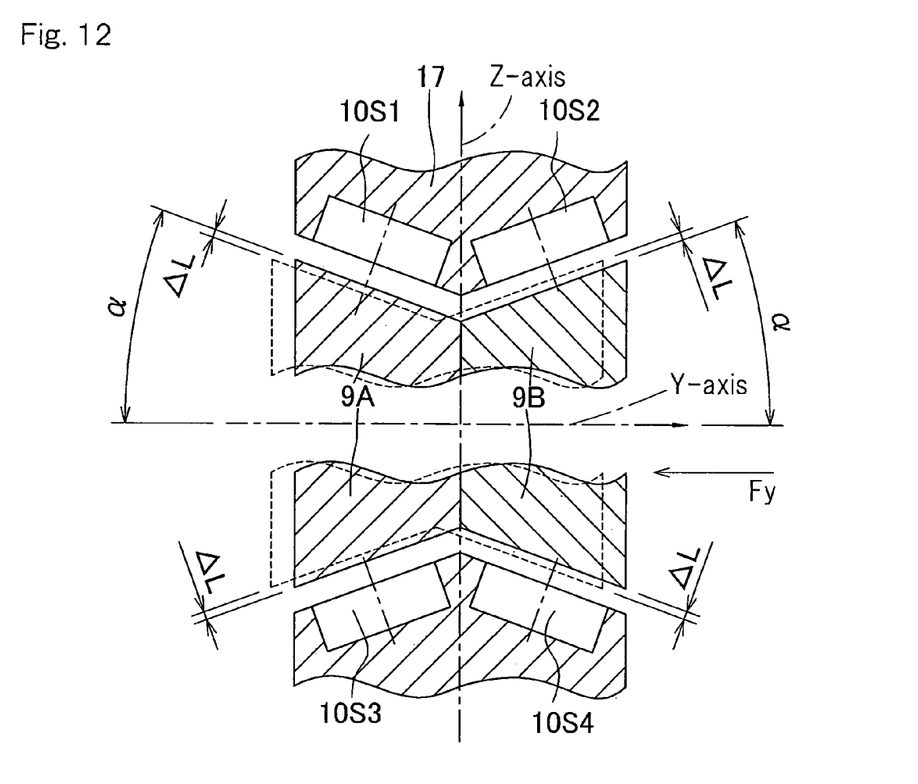
FIG. 12 is an explanatory diagram in a vertical sectional representation, showing the manner of detection of load with the load sensor unit when an axial load acts on the wheel support bearing assembly.

FIGS. 10 and 12 illustrate an explanatory diagram used to explain the manner of detection when the axially (Y-axis direction) acting load (Fy) acts on the hub axle 2A in a direction outwardly of the automotive vehicle (in a negative direction of the Y-axis), that is, towards the outer or outboard side of the vehicle body. In FIGS. 10 and 12, respective positions of the rings 9A and 9B assumed when the axial load Fy acts on the hub axle 2A are expressed by the broken lines. At this time, the rings 9A and 9B move away from the sensor elements 10Sa, 10SC, 10S1 and 10S3 disposed on the outer side or outboard side of the vehicle body in the face-to-face relation with the outer peripheral surfaces of the rings 9A and 9B, resulting in increase of the distances between the sensor elements 10Sa, 10SC, 10S1 and 10S3 and the rings 9A and 9B. On the other hand, the rings 9A and 9B move close to the sensor elements 10Sb, 10Sd, 10S2 and 10S4 disposed on the inner side or inboard side of the vehicle body in the face-to-face relation with the outer peripheral surfaces of the rings 9A and 9B, resulting in decrease of the distances between the sensor elements 10Sb, 10Sd, 10S2 and 10S4 and the rings 9A and 9B.

Figure 11:
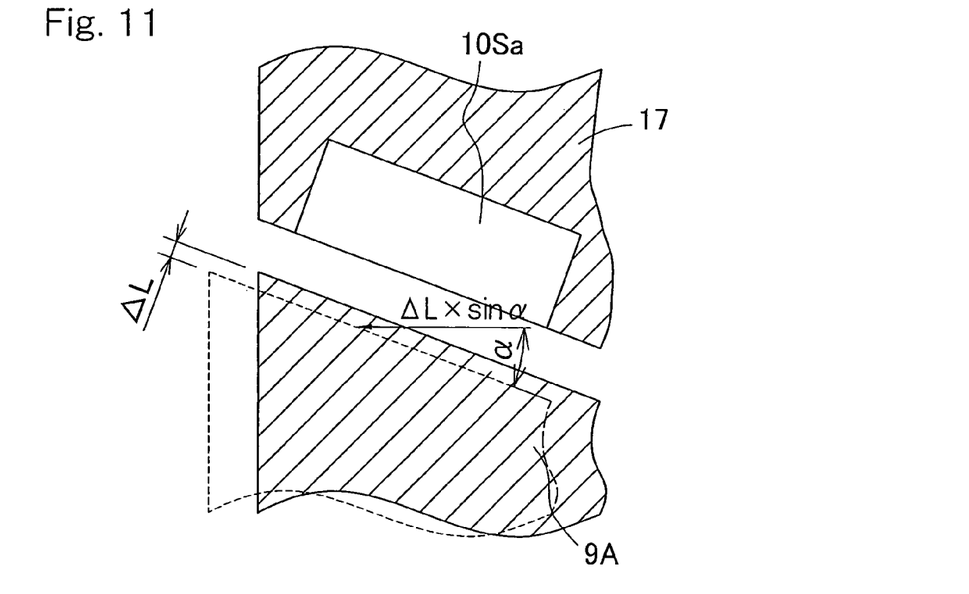
FIG. 11 is a fragmentary enlarged view of a portion of FIG. 10
Figure 13:
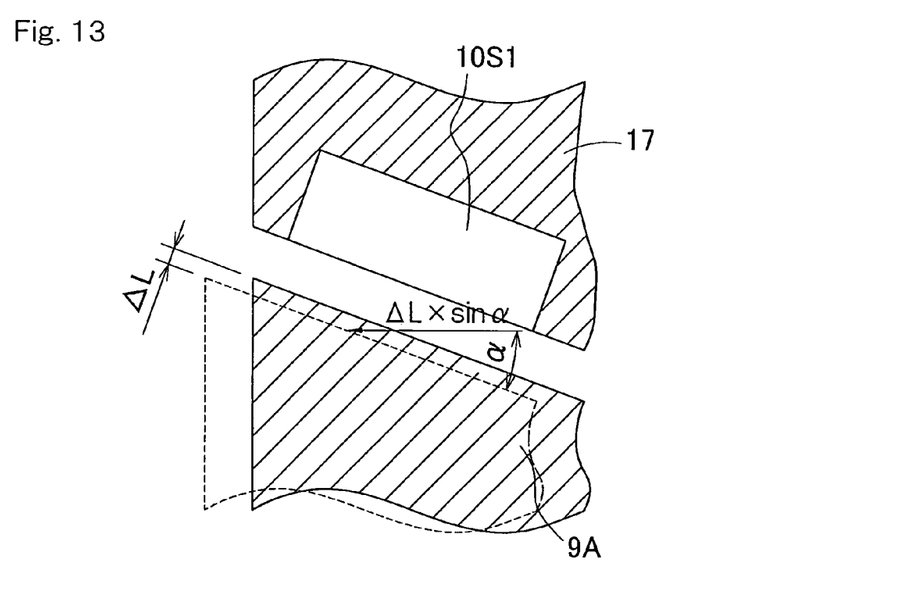
FIG. 13 is a fragmentary enlarged view of a portion of FIG. 12.

FIGS. 11 and 13 illustrate, on an enlarged scale, the sensor elements 10Sa and 10S1 and their vicinities under that condition. At this time, assuming that the distance between each of the sensor elements 10Sa and 10S1 and the ring 9A confronting the sensor elements 10Sa and 10S1 is changed by ΔL by the axially acting load Fy, a positive sign is used in the case where such distance increases relative to that exhibited when under a non-loaded condition (shown by the solid line in FIGS. 10 to 13) and a negative sign is used in the case where such distance decreases relative to that exhibited when under the non-loaded condition, respective displacement components of the sensor elements 10Sa, 10Sb, 10Sc, 10Sd, 10S1, 10S2, 10S3 and 10S4 in the axial direction (Y-axis direction) can be expressed as follows, noting that α represents the angle of tapering of each of the rings 9A and 9B:

Displacement detected by Sensor Element 10Sa in the axial direction (Y-axis direction):

$$\Delta Say = \Delta L/\sin\alpha$$

Displacement detected by Sensor Element 10Sb in the axial direction (Y-axis direction):

$$\Delta Sby = -\Delta L/\sin\alpha$$

Displacement detected by Sensor Element 10Sc in the axial direction (Y-axis direction):

$$\Delta Scy = \Delta L/\sin\alpha$$

Displacement detected by Sensor Element 10Sd in the axial direction (Y-axis direction):

$$\Delta Sdy = -\Delta L/\sin\alpha$$

Displacement detected by Sensor Element 10S1 in the axial direction (Y-axis direction):

$$\Delta S1y = \Delta L/\sin\alpha$$

Displacement detected by Sensor Element 10S2 in the axial direction (Y-axis direction):

$$\Delta S2y = -\Delta L/\sin\alpha$$

Displacement detected by Sensor Element 10S3 in the axial direction (Y-axis direction):

$$\Delta S3y = \Delta L/\sin\alpha$$

Displacement detected by Sensor Element 10S4 in the axial direction (Y-axis direction):

$$\Delta S4y = -\Delta L/\sin\alpha$$

Using those amounts of displacement, the distance of movement of the hub axle 2A relative to the outer member 1 can be calculated by the following equation, in which the displacement of the hub axle 2A in the Y-axis direction is expressed by ΔY:

$$\begin{aligned}\Delta Y &= \frac{1}{8} \times (\Delta Say - \Delta Sby + \Delta Scy - \Delta Sdy + \Delta S1y - \Delta S2y + \\ &\quad \Delta S3y - \Delta S4y) \\ &= \frac{1}{8} \times \{(\Delta L/\sin\alpha) - (-\Delta L/\sin\alpha) + \\ &\quad (\Delta L/\sin\alpha) - (-\Delta L/\sin\alpha) + (\Delta L/\sin\alpha) - (-\Delta L/\sin\alpha) + \\ &\quad (\Delta L/\sin\alpha) - (-\Delta L/\sin\alpha)\} \\ &= \Delta L \times \sin\alpha\end{aligned}$$

With the respective outputs of the sensor elements 10Sa, 10Sb, 10Sc, 10Sd, 10S1, 10S2, 10S3 and 10S4, it is possible to detect only the displacement of the hub axle 2A relative to the outer member 1 in the Y-axis direction, which has resulted from the axially acting load Fy. When the amount of displacement so detected is substituted into the equation which determines the load based on the amount of displacement predetermined from experiments and simulations, the axial load Fy is calculated. Such calculation is carried out by the calculator 20 (FIG. 1) connected to the harness 32. Also, since detection is made by the eight sensor elements 10Sa, 10Sb, 10Sc, 10Sd, 10S1, 10S2, 10S3 and 10S4, the detection accuracy is good. Yet, since the sensor elements 10Sa, 10Sb, 10Sc, 10Sd, 10S1, 10S2, 10S3 and 10S4 are arranged symmetrically relative to the X-axis, Y-axis and Z-axis, any change in displacement resulting from temperature-dependent thermal expansion and shrinkage of the rings 9A and 9B can be removed easily.

Figure 14:
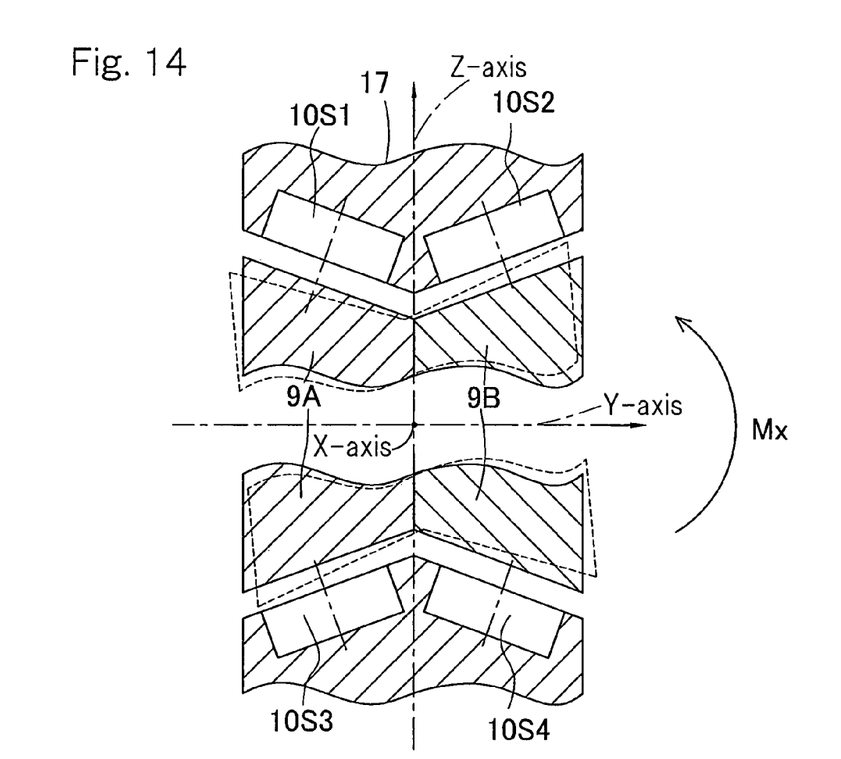
FIG. 14 is an explanatory diagram showing the manner of detection of load with the load sensor unit when a moment load about a horizontal axis acts on the wheel support bearing assembly.

FIG. 14 illustrates an explanatory diagram used to explain the manner of detection when the moment load Mx acting around the horizontal axis (X-axis) is imposed on the hub axle 2A. In FIG. 14, respective positions of the rings 9A and 9B assumed when the moment load Mx acts on the hub axle 2A are expressed by the broken lines. At this time, of the four sensor elements 10S1, 10S2, 10S3 and 10S4 arranged in a vertical plane along the Z-axis, the distances between the two sensor elements 10S1 and 10S4, arranged in diagonally opposed relation to each other about the X-axis, and the rings 9A and 9B increase. On the other hand, the distances between the remaining two sensor elements 10S2 and 10S3, arranged in diagonally opposed relation to each other about the same X-axis, and the rings 9A and 9B decrease.

Figure 15:
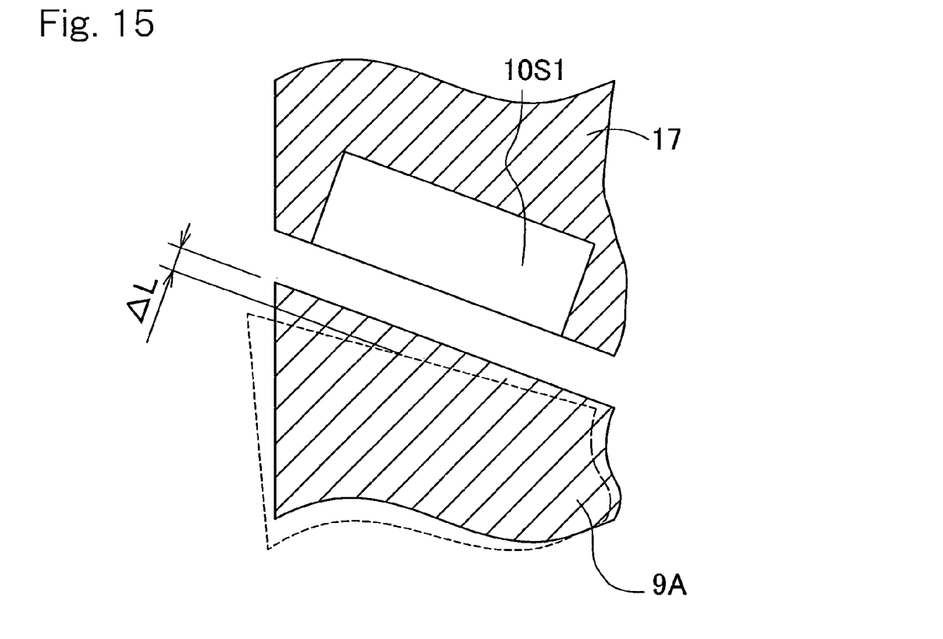
FIG. 15 is a fragmentary enlarged view of a portion of FIG. 14.

FIG. 15 illustrates, on an enlarged scale, the sensor element 10S1 and its vicinity under that condition. At this time, assuming that the distance between each of the sensor elements 10S1 to 10S4 and the corresponding ring 9A or 9B confronting the sensor elements 10S1 to 10S4 is changed by ΔL by the moment load Mx acting around the horizontal axis (X-axis), a positive sign is used in the case where such distance increases relative to that exhibited when under a non-loaded condition (shown by the solid line in FIGS. 14 and 15) and a negative sign is used in the case where such distance decreases relative to that exhibited when under the non-loaded condition, respective displacement components of the sensor elements 10S1, 10S2, 10S3 and 10S4 can be expressed as follows:

Displacement detected by Sensor Element 10S1:

$$\Delta S1 = \Delta L$$

Displacement detected by Sensor Element 10S2:

$$\Delta S2 = -\Delta L$$

Displacement detected by Sensor Element 10S3:

$$\Delta S3 = -\Delta L$$

Displacement detected by Sensor Element 10S4:

$$\Delta S4 = \Delta L$$

Using those amounts of displacement, the displacement ΔXθ of the hub axle 2A relative to the outer member 1, corresponding to the angle of rotation θ of the hub axle 2A around the X-axis, can be calculated by the following equation:

$$\Delta X\theta = \frac{1}{4} \times (\Delta S1 - \Delta S2 - \Delta S3 + \Delta S4)$$

$$= \frac{1}{4} \times \{(\Delta L) - (-\Delta L) - (-\Delta L) + (\Delta L)\}$$

$$= \Delta L$$

With the respective outputs of the four sensor elements 10S1, 10S2, 10S3 and 10S4, it is possible to detect the displacement of the hub axle 2A relative to the outer member 1, corresponding to the angle of rotation θ of the hub axle 2A around the X-axis, which has resulted from the moment load Mx. When the amount of displacement so detected is substituted into the equation which determines the load based on the amount of displacement predetermined from experiments and simulations, the moment load Mx is calculated. Such calculation is carried out by the calculator 20 (FIG. 1) connected to the harness 32. Also, since detection is made by the four sensor elements 10S1, 10S2, 10S3 and 10S4, the detection accuracy is good. Yet, since the sensor elements 10S1, 10S2, 10S3 and 10S4 are arranged symmetrically relative to the Z-axis and Y-axis, any change in displacement resulting from temperature-dependent thermal expansion and shrinkage of the rings 9A and 9B can be removed easily.

Figure 16:
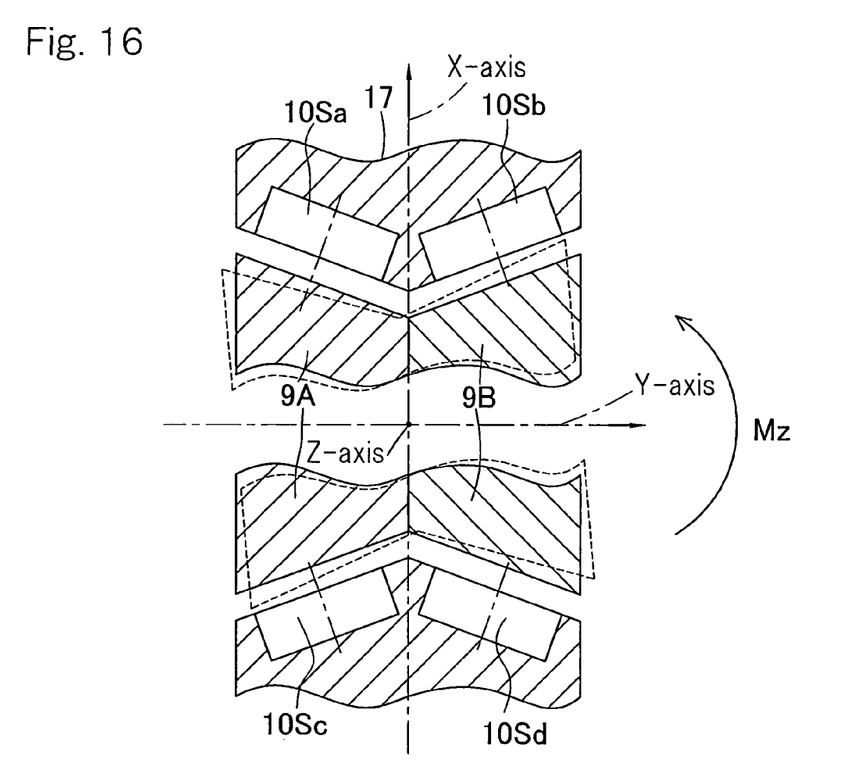
FIG. 16 is an explanatory diagram showing the manner of detection of a moment load acting about the vertical axis with the load sensor when such moment load acts on the wheel support bearing assembly.

FIG. 16 illustrates an explanatory diagram used to explain the manner of detection when the moment load Mz acting around the vertical axis (Z-axis) is imposed on the hub axle 2A. In FIG. 16, respective positions of the rings 9A and 9B assumed when the moment load Mz acts on the hub axle 2A are expressed by the broken lines. At this time, of the four sensor elements 10Sa, 10Sb, 10Sc and 10Sd arranged in a horizontal plane along the X-axis, the distances between the two sensor elements 10Sa and 10Sd, arranged in diagonally opposed relation to each other about the Z-axis, and the rings 9A and 9B increase. On the other hand, the distances between the remaining two sensor elements 10Sb and 10Sc, arranged in diagonally opposed relation to each other about the Z-axis, and the rings 9B and 9A decrease.

Figure 17:
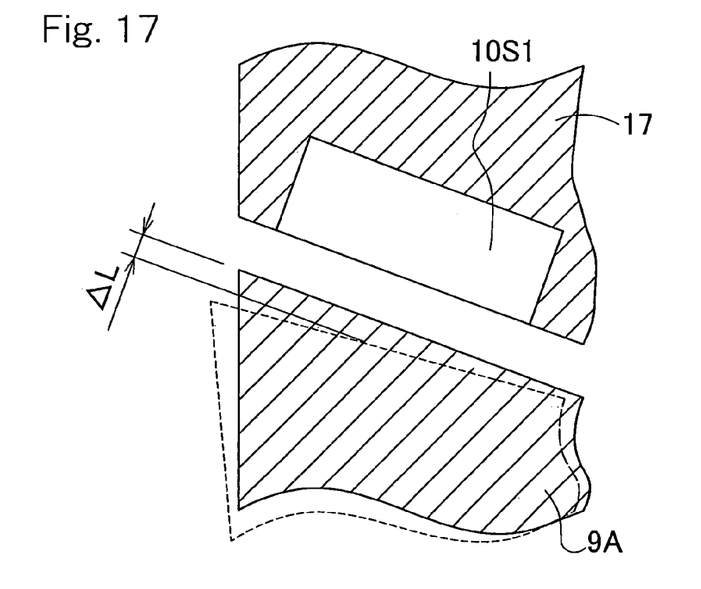
FIG. 17 is a fragmentary enlarged view of a portion of FIG. 16.

FIG. 17 illustrates, on an enlarged scale, the sensor element 10Sa and its vicinity under that condition. At this time, assuming that the distance between each of the sensor element 10Sa to 10Sd and the corresponding ring 9A or 9B confronting the sensor element 10Sa to 10Sd is changed by ΔL by the moment load Mz acting around the vertical axis (Z-axis), a positive sign is used in the case where such distance increases relative to that exhibited when under a non-loaded condition (shown by the solid line in FIGS. 16 and 17) and a negative sign is used in the case where such distance decreases relative to that exhibited when under the non-loaded condition, respective displacement components of the sensor elements 10Sa, 10Sb, 10Sc and 10Sd can be expressed as follows:

Displacement detected by Sensor Element 10Sa:

$\Delta Sa = \Delta L$

Displacement detected by Sensor Element 10Sb:

$\Delta Sb = -\Delta L$

Displacement detected by Sensor Element 10Sc:

$\Delta Sc = -\Delta L$

Displacement detected by Sensor Element 10Sd:

$\Delta Sd = \Delta L$

Using those amounts of displacement, the displacement ΔZθ of the hub axle 2A relative to the outer member 1, corresponding to the angle of rotation θ of the hub axle 2A around the Z-axis, can be calculated by the following equation:

$$\Delta Z\theta = \frac{1}{4} \times (\Delta Sa - \Delta Sb - \Delta Sc + \Delta Sd)$$

$$= \frac{1}{4} \times \{(\Delta L) - (-\Delta L) - (-\Delta L) + (\Delta L)\}$$

$$= \Delta L$$

With the respective outputs of the four sensor elements 10Sa, 10Sb, 10Sc and 10Sd, it is possible to detect the displacement of the hub axle 2A relative to the outer member 1, corresponding to the angle of rotation θ of the hub axle 2A around the Z-axis, which has resulted from the moment load Mz. When the amount of displacement so detected is substituted into the equation which determines the load based on the amount of displacement predetermined from experiments and simulations, the moment load Mz is calculated. Such calculation is carried out by the calculator 20 (FIG. 1) connected to the harness 32. Also, since detection is made by the four sensor elements 10Sa, 10Sb, 10Sc and 10Sd, the detection accuracy is good. Yet, since the sensor elements 10Sa, 10Sb, 10SC and 10Sd are arranged symmetrically relative to the X-axis and Y-axis, any change in displacement resulting from temperature-dependent thermal expansion and shrinkage of the rings 9A and 9B can be removed easily.

Furthermore, in the event that the moment load My acting around the rotation axis (Y-axis) is imposed on the hub axle 2A, the moment load My is detected in the following manner.

Specifically, the moment load My is determined by the following equation of the product of the vertically (Z-axis direction) acting load Fz, determined by the above described detecting manner, and the radius R of the tire (not shown) secured to the hub axle 2A.

$My = Fz \times R$

This calculation is carried out by the calculator 20 (FIG. 1) connected to the harness 32.

As described above, according to the sensor-incorporated wheel support bearing assembly 18 of the foregoing structure, the load sensor unit 11 can be compactly mounted on the automotive vehicle and the loads acting on the wheel can be detected stably. The detected angle value and the detected load value, both obtained from the load sensor unit 11, are supplied to ECU (Electric Control Unit) mounted on the automotive vehicle and can also be used for the control of the automobile traveling stability and transmission of road information in the steer-by-wire system.

Figure 18:
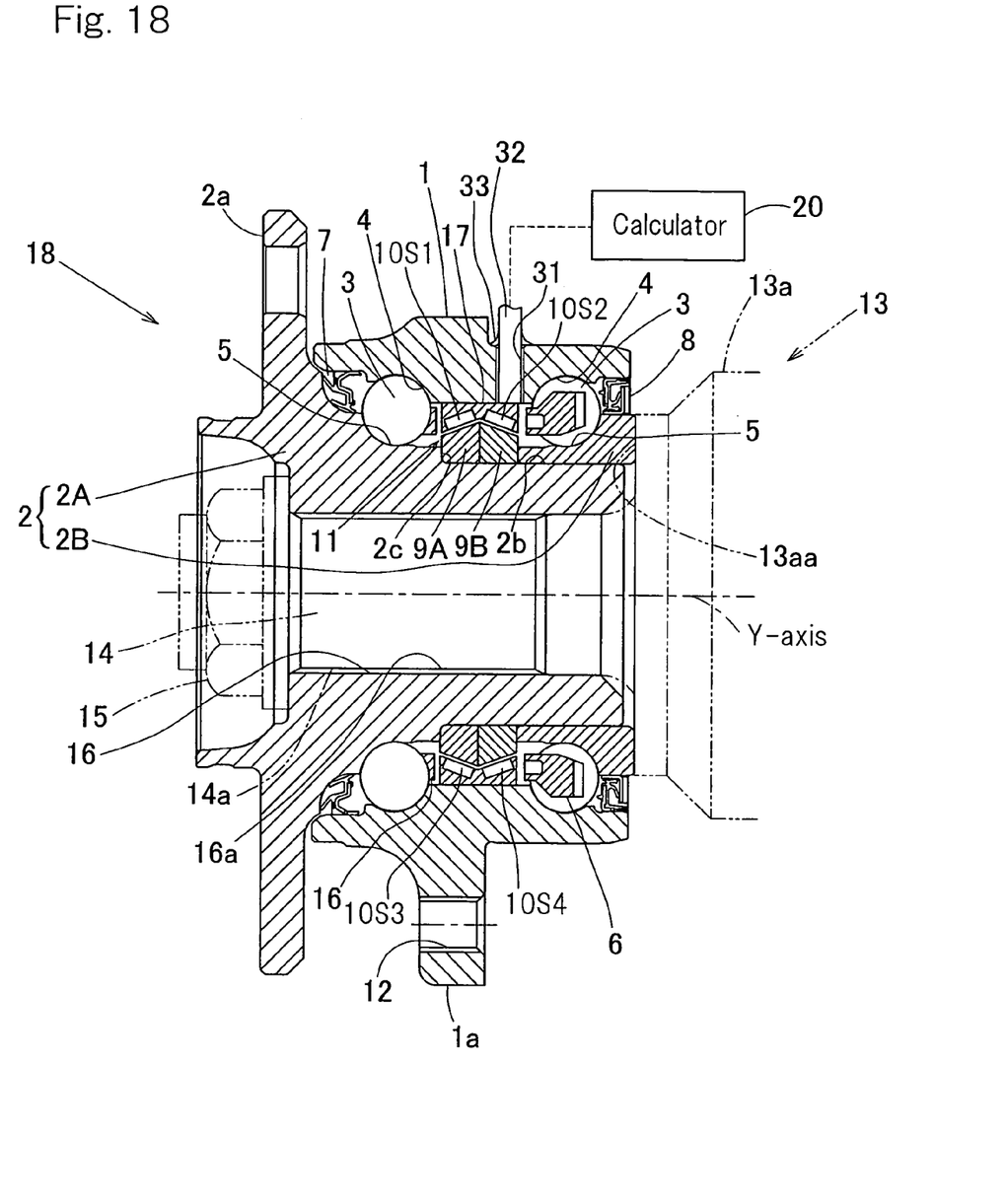
FIG. 18 is a longitudinal sectional view of the wheel support bearing assembly according to a second preferred embodiment of the present invention.

FIG. 18 illustrates a second preferred embodiment of the present invention. The sensor-incorporated wheel support bearing assembly according to this second embodiment is substantially similar to that shown and described in connection with the foregoing first embodiment, but differs therefrom in that in this second embodiment, the direction of tapering in each of the respective outer peripheral surfaces of the axially juxtaposed rings 9A and 9B are reversed relative to that shown and described in connection with the first embodiment. Specifically, the outer peripheral surface of the outboard ring 9A is tapered with its diameter increasing in a direction towards the inboard side, whereas the outer peripheral surface of the inboard ring 9B is tapered with its diameter increasing in a direction towards the outboard side. Other structural features of the wheel support bearing assembly according to this embodiment are substantially similar to those of the wheel support bearing assembly according to the first embodiment.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A sensor-incorporated wheel support bearing assembly for rotatably supporting a wheel relative to an automotive vehicle, the wheel support bearing assembly comprising:
   an outer member having an inner peripheral surface formed with double rows of raceway surfaces;
   an inner member having an outer peripheral surface formed with raceway surfaces opposed to the raceway surfaces in the outer member; and
   double rows of rolling elements interposed between the raceway surfaces in the outer and inner members;
   a ring having an outer peripheral surface tapered and secured to the inner member;
   a displacement sensor mounted on the outer member or a member, that is rigidly secured to the outer member, so as to confront the tapered outer peripheral surface of the ring, the displacement sensor being operable to measure a distance between the displacement sensor and the ring.

2. The sensor-incorporated wheel support bearing assembly as claimed in claim 1, wherein the ring comprises first and second rings mounted on the outer peripheral surface of the inner member in axially juxtaposed relation to each other and having respective outer peripheral surfaces that are tapered in respective directions opposite to each other, and wherein the displacement sensor is disposed in face-to-face relation with the first and second rings.

3. The sensor-incorporated wheel support bearing assembly as claimed in claim 2, wherein the displacement sensor comprises eight sensor elements, two sensor elements being disposed on each of upper and lower portions of the outer member with respect to a horizontally lying longitudinal axis of the bearing assembly so as to confront the first and second rings whereas two sensor elements are disposed on each of right and left portions of the outer member with respect to the longitudinal axis of the bearing assembly along a horizontal axis perpendicular to the longitudinal axis of the bearing assembly so as to confront the first and second rings.

4. The sensor-incorporated wheel support bearing assembly as claimed in claim 1, further comprising a calculator for calculating an output of the displacement sensor to determine the load acting on the inner member.

5. The sensor-incorporated wheel support bearing assembly as claimed in claim 1, wherein the displacement sensor is of a reluctance type including a coil winding.

6. The sensor-incorporated wheel support bearing assembly as claimed in claim 1, wherein the ring is made of a ferromagnetic material and the displacement sensor includes a combination of a magnet and a magnetic detecting element capable of providing an analog output.

7. The sensor-incorporated wheel support bearing assembly as claimed in claim 1, wherein the inner member includes a hub axle, having one of the raceway surfaces formed therein and having the wheel mounted thereon, and an inner race having the other of the raceway surfaces formed therein, and wherein the ring is mounted on the outer peripheral surface of the hub axle and positioned axially while being sandwiched between a stepped face, defined in the hub axle, and the inner race.

* * * * *